(12) United States Patent
Shi et al.

(10) Patent No.: US 9,458,252 B2
(45) Date of Patent: Oct. 4, 2016

(54) STARCH ESTERS AND METHOD OF PREPARATION

(75) Inventors: Yong-Cheng Shi, Manhattan, KS (US); Yanjie Bai, Manhattan, KS (US)

(73) Assignee: KANSAS STATE UNIVERSITY RESEARCH FOUNDATION, Manhattan, KS (US)

( * ) Notice: Subject to any disclaimer, the term of this patent is extended or adjusted under 35 U.S.C. 154(b) by 586 days.

(21) Appl. No.: 13/146,631

(22) PCT Filed: Feb. 3, 2010

(86) PCT No.: PCT/US2010/023062
§ 371 (c)(1),
(2), (4) Date: Jul. 27, 2011

(87) PCT Pub. No.: WO2010/091091
PCT Pub. Date: Aug. 12, 2010

(65) Prior Publication Data
US 2011/0287165 A1    Nov. 24, 2011

Related U.S. Application Data

(60) Provisional application No. 61/149,541, filed on Feb. 3, 2009.

(51) Int. Cl.
*C08B 31/04*  (2006.01)
*C08L 3/06*  (2006.01)

(52) U.S. Cl.
CPC . *C08B 31/04* (2013.01); *C08L 3/06* (2013.01)

(58) Field of Classification Search
CPC .................................. C08B 31/04; C08L 3/06
USPC ........................................................... 426/661
See application file for complete search history.

(56) References Cited

U.S. PATENT DOCUMENTS

| | | | |
|---|---|---|---|
| 2,461,139 A * | 2/1949 | Caldwell | 536/110 |
| 2,661,349 A | 12/1953 | Caldwell et al. | |
| 3,732,207 A * | 5/1973 | Kovats | 536/103 |
| 4,035,235 A | 7/1977 | Richards et al. | |
| 5,593,503 A * | 1/1997 | Shi et al. | 127/71 |
| 6,037,466 A | 3/2000 | Maliczyszyn et al. | |

OTHER PUBLICATIONS

Damodaran et al (ed), Fennema's Food Chemistry Fourth Edition CRC Press pp. 131 and 132.*
Han, Jung-Ah et al.; Carbohydrate Polymers 67 (2007); (pp. 366-374).
Xiaoyan Song, et al.; Starch 58 (2006) (pp. 109-117).
Jinsong Bao et al., J. Agric. Food Chem. 2003, (pp. 2283-2287).
International Search Report and Written Opinion mailed Nov. 12, 2010 for International Application No. PCT/US2010/023062, filed Feb. 3, 2010; Inventors: Shi, Yong-Cheng et al. (9 pages).

* cited by examiner

*Primary Examiner* — Jenna A Watts
(74) *Attorney, Agent, or Firm* — Hovey Williams LLP

(57) ABSTRACT

A lipophilic starch is provided along with methods of making the same. The starch is prepared by modifying the starch with an organic acid anhydride reagent, such as octenyl succinic anhydride, drying the modified starch to a moisture content of less than 15% by weight, and then heat treating the dried starch at a temperature of at least 100° C. for at least one minute.

12 Claims, 7 Drawing Sheets

STARCH ESTERS AND METHOD OF PREPARATION

RELATED APPLICATIONS

This application is a U.S. national stage submission under 35 U.S.C. 371 of PCT International Patent Application No. PCT/2010/023062, filed Feb. 3, 2010, which claims the priority benefit of U.S. Provisional Patent Application No. 61/149,541, filed Feb. 3, 2009, both of which are hereby incorporated by reference in their entirety.

BACKGROUND OF THE INVENTION

1. Field of the Invention

The present invention is generally directed towards starch that has been modified with an organic acid anhydride reagent and methods of preparing the same. In certain embodiments, starch produced according to the present invention exhibits good water solubility and emulsifying characteristics when compared with conventional starches. Further, methods of preparing modified starches according to the present invention do not require further treatment with acids, other than the organic acid anhydride reagent, or enzymes to degrade the starch and make it water soluble.

2. Description of the Prior Art

Native starch is partially crystalline and not soluble in water at room temperature. Also, native starch molecules are hydrophilic and do not possess emulsifying properties. A number of references such as U.S. Pat. Nos. 2,661,349 and 6,037,466 disclose introducing hydrophobic groups to the starch by reaction with cyclic dicarboxylic acid anhydrides so that the starch can be used as an emulsion stabilizer.

Octenyl succinc acid anhydride (OSA) treated starch, prepared by adding up to 3% OSA, has been approved by the FDA for food use and can be used in food and beverage applications, such as in encapsulation of vitamins and flavors. Starch may also be reacted with greater than 3% OSA for non-food applications, such as in oil- and petroleum-based cosmetics, or pharmaceutical pastes, alcohol-based lotions, body deodorant sprays, and encapsulation of fragrances, clouds, and oils. Conventionally, OSA-modified starch must undergo acid hydrolysis or enzymatic conversion in order to be converted (or degraded) and rendered water soluble at room temperature. Modified starch that undergoes this further processing may contain acid or enzyme residues.

SUMMARY OF THE INVENTION

In accordance with one embodiment of the present invention, there is provided a method of preparing a lipophilic starch. An organic acid anhydride reagent is added to a starch mixture thereby forming a reaction mixture. The pH of the starch mixture is adjusted to between about 7 to about 11 either before or after addition of the organic acid anhydride reagent. The reaction mixture is dried to a moisture content of between about 0 to about 15% by weight. The dried reaction mixture is heated at a temperature of at least about 100° C. for between about 1 minute to about 6 hours.

In accordance with another embodiment of the present invention, there is provided a water-soluble, lipophilic starch comprising starch that has been modified with an organic acid anhydride reagent. The modified starch contains less than about 0.5% by weight of one or more mineral acids and/or less than about 0.1% by weight of starch-degrading enzyme residues. The starch also has a solubility in water at 25° C. of greater than about 90%.

In accordance with another embodiment of the present invention, there is provided a lipophilic starch comprising a starch that has been modified with an organic acid anhydride reagent. The lipophilic starch, when dispersed in glycerol and viewed with a microscope under polarized light, has a granular shape and is birefringent.

In accordance with yet another embodiment of the present invention, emulsion made with the water-soluble, lipophilic starch are provided. In particular embodiments, the emulsion is very stable, there being no observable phase separation even after storage for 24 hours at 45° C.

In accordance with still another embodiment of the present invention, food products made with the starches described herein are provided. The starch employed in the food product may be a water-soluble, lipophilic starch as described herein, or the starch can be a lipophilic starch made in accordance with the methods described herein.

DETAILED DESCRIPTION OF THE PREFERRED EMBODIMENT

Figure 1A:
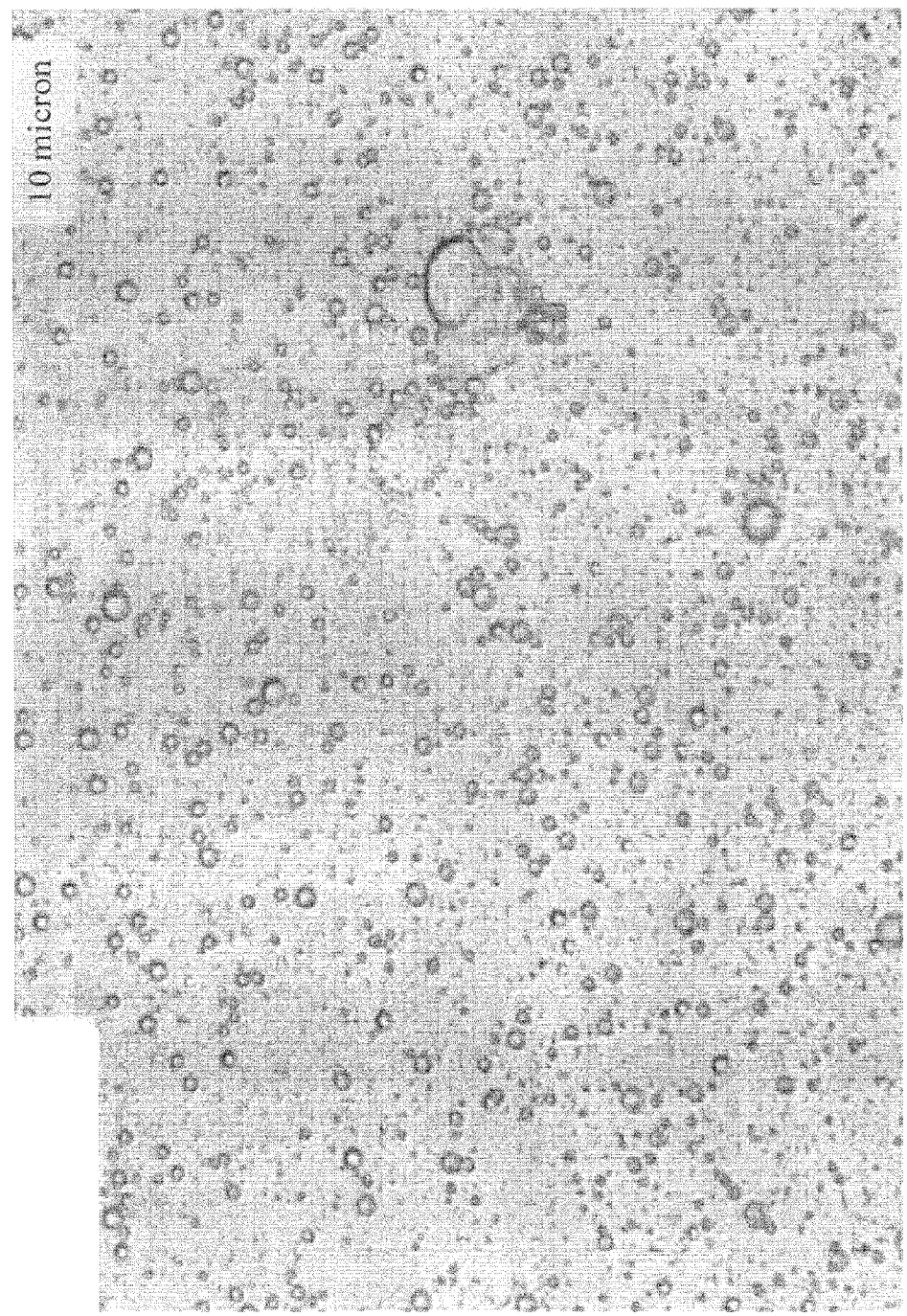
FIG. 1a is a microscope photograph of a first emulsion sample prepared from sample 7-E after heating at 45° C. for 24 hours.

The present invention provides a method for introducing a hydrophobic group onto starch molecules, degrading the starch, and making the starch water soluble. The starch to be modified according to the present invention may be native, converted, or derivatized. Exemplary starches include those derived from corn, potato, wheat, rice, tapioca, sago, sorghum, waxy maize, waxy wheat, waxy potato, or high amylose corn.

In certain embodiments, the process begins by preparing a starch mixture that has a neutral to basic pH. In one embodiment, the starch mixture may be in the form of a starch slurry prepared by mixing the starch with water, an alcohol, of other organic solvent, such as toluene. In one particular embodiment, the slurry is prepared with water and/or alcohol, wherein the alcohol is selected from the group consisting of methanol, ethanol, isopropyl alcohol, and mixtures thereof. The pH of the mixture or slurry is adjusted to between about 7 to about 11 by the addition of a base. In certain embodiments, the base is selected from the group consisting of metal and non-metal hydroxides, oxides, carbonates, and mixtures thereof. In further embodiments, the base is selected from the group consisting of sodium hydroxide, ammonium hydroxide, ammonium carbonate, ammonium bicarbonate, and mixtures thereof. In still other embodiments, the pH of the mixture or slurry is adjusted to between about 8 to about 11, or even to between about 8.5 to about 10.

Next, the starch mixture is processed to obtain a starch cake. In certain embodiments, this processing step involves removing liquid from the slurry, such as by filtration. To the starch cake, an organic acid anhydride reagent is added thereby forming a reaction mixture. In certain embodiments, the organic acid anhydride reagent has the general formula

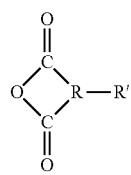

wherein R is a dimethylene or trimethylene group and R' is a linear, branched or cyclic alkyl, alkenyl, aralkyl or aralkenyl group having 2 to 20 carbon atoms. In further embodiments, the organic acid anhydride reagent is octenyl succininc acid anhydride (OSA). The organic acid anhydride reagent is generally added to the cake at a level of between about 0.5% to about 100% by weight, based upon the dry weight of the starch. In still other embodiments, the organic acid anhydride reagent is generally added to the case at a level of between about 1% to about 25% by weight, or even between about 2% to about 9% by weight, based upon the dry weight of the starch. The organic acid anhydride may be added to or mixed with the starch cake by any means known to those of skill in the art, such as, for example, by spraying.

In another embodiment according to the present invention, a starch slurry is prepared and the organic acid anhydride reagent is added to the slurry and mixed. Mixing of the organic acid anhydride reagent and starch slurry may be accomplished by any number of means known in the art. The pH of the starch slurry may be adjusted to the desired level either before or after addition of the organic acid anhydride reagent. In one particular embodiment, the OS-modified starch slurry is filtered to obtain a starch cake. In yet another embodiment, the OS-modified starch is recovered by spray drying.

After permitting the reaction between the starch and organic acid anhydride reagent to proceed for a predetermined period of time, the reaction mixture is dried to a moisture content of between about 0 to about 15% by weight. In other embodiments, the reaction mixture is dried to a moisture content of between about 0% to about 10%, or even between about 0% to about 6% by weight. In certain embodiments, the drying step comprises heating the reaction mixture to a temperature of less than about 140° C., or between about 25° C. to about 90° C., or between about 30° C. to about 60° C.

Once the desired moisture content is reached, the dried reaction mixture is healed at a temperature of at least about 100° C., or between about 100° C. to about 200° C., or between about 140° C. to about 180° C. This heating step may be carried out for between about 1 minute to about 6 hours, or between about 30 minutes to about 4 hours, or between about 1 to 3 hours. Both the drying and heating steps may be carried out with any suitable apparatus known to those of skill in the art, including forced air ovens, dextrinizers, and fluidized bed dryers.

In certain embodiments according to the present invention, the starch modified with the organic acid anhydride reagent does not undergo a subsequent acid hydrolysis step. Thus, the need to hydrolyze the modified starch with a mineral acid such as HCl or $H_2SO_4$ is eliminated. Likewise, the present invention eliminates the need for enzymatic conversion of the modified starch, such as with α-amylase or any enzyme within the amylase family, in order to degrade the starch. Therefore, it is an advantage of certain embodiments of the present invention that the starch produced contains essentially no residues of such mineral acids or enzymes.

The modified starch prepared in accordance with the present invention may be water insoluble, partially water soluble, or completely water soluble. Water solubility of the modified starch is measured by a refractometer. A 10% solids dispersion is prepared, centrifuged, and the supernatant is analyzed by the refractometer. In certain embodiments, the modified starch has a solubility in water at 25° C. of greater than about 90%, or greater than about 95%, or even greater than about 98%.

As noted above, it is possible to prepare modified starch according to the present invention wherein the starch is degraded, so as to improve the water solubility thereof, without the addition of mineral acids or starch-degrading enzymes (e.g., amylase enzymes). Therefore, in certain embodiments, the modified starch will have a water solubility as described herein and contain less than about 0.5%, or less than about 0.1%, or even less than 0.01% by weight of mineral acid. Additionally or alternatively, the water soluble modified starch will contain less than about 0.1% by weight, or even less than 0.01% by weight of starch-degrading enzyme residues. As used herein, the term ""starch-degrading enzyme residues" can refer to the enzymes themselves or to denatured forms of the enzymes. In alternate embodiments, the water-soluble, modified starches are substantially free of mineral acid and/or starch-degrading enzyme residues.

In other embodiments according to the present invention, a lipophilic starch comprising a starch that has been modified with an organic acid anhydride reagent may be prepared, which, when suspended in glycerol and viewed with a microscope under polarized light, has a granular shape and is birefringent. Also, the water-soluble, lipophilic starches described above may also possess these characteristics.

The starches described above and those starches made in accordance with the methods described herein, particularly those starches that are water soluble, can be used in the formation of emulsions. The emulsions produced with the modified starch exhibit excellent stability with no observable phase separation even upon storage of the emulsion at 45° C. for 24 hours. Exemplary emulsions include those comprising essential oils, such as orange oil. The emulsions may be prepared in any manner known in the art.

The starches described above and those starches made in accordance with the methods described herein can also be used in various food products. Also, the modified starches used in food products need not necessarily exhibit a high level of water solubility, so long as the lipophilic starch is made by a method according to the present invention.

EXAMPLES

The following examples set forth the effects of pH, temperature, and exposure times on degree of substitution, reaction efficiency, and solubility of the modified starch. It is to be understood, however, that these examples are provided by way of illustration and nothing therein should be taken as a limitation upon the overall scope of the invention.

Materials and Methods

Octenyl succinic acid anhydride ("OSA") was obtained from Gulf Bayport Chemicals L.P. (Pasadena, Tex.). Waxy maize starch (Amoica TF) was provided by National Starch and Chemical (Bridgewater, N.J.). All other chemicals used in the following examples were analytical grade.

Titration Method 1

In the following examples, degree of substitution ("D.S.") was measured by titration. For the insoluble modified starches reacted with 3% OSA, 5.00 g dry weight of the starch was suspended in 20.0 mL of 0.100 M HCl, and stirred for 30 minutes. The suspension was filtered through a piece of No.2 filter paper (Whatman Internal Ltd.), and the residue was washed with water until no Cl could be detected by 0.1 M $AgNO_3$ solution. The starch was then re-suspended in 300 mL water and heated in a boiling water bath for 20 minutes. After cooling down, the starch solution was titrated with 0.100 M NaOH solution, using phenolphthalein as an indicator. The control used is described in each example. The % bound octenyl succinate (OS), D.S., and reaction efficiency ("R.E.") were calculated using the following equations:

$$\% OS = \frac{(V_1 - V_2) \times 0.1 \times 21}{W}$$

where % OS is the percentage weight of OS in OS modified starch, $V_1$ is the titration volume of NaOH (mL) for OS starch, $V_2$ is the titration volume of NaOH (mL) for control, and W is the dry weight (g) of the OS starch.

$$D.S. = \frac{162 \times \% OS}{210 - 209 \times \% OS}$$

$$R.E. = \frac{\% OS \text{ of } OS \text{ starch}}{\% OSA \text{ added to the starch}} \times 100\%$$

Titration Method 2

The bound OS content for modified starches reacted with greater than 3% OSA, partially and completely soluble OS starches was determined, by first suspending 5.00 g dry weight of the starch in 20.0 mL of methanol and filtered. The cake was re-suspended in a 20 ml, mixture of 0.100 M HCl and methanol (1:9, w/w) and stirred for 30 minutes. The starch was filtered and washed with a 40 mL mixture of water and methanol (1:9, w/w), and then dispersed in 300 mL water. For the completely soluble samples, the solutions were titrated by 0.100 M NaOH directly. For partially soluble starches, the suspensions were cooked in a boiling water bath for 20 minutes and the solutions were titrated after cooling down. Phenolphthalein was used as an indicator. The D.S., % OS and R.E. were calculated by the same equations above in method 1.

Solubility of OS Starch

A potable refractometer was used to check the solubility of the OS starch. A 10% solids suspension was prepared, centrifuged, and the supernatant was analyzed by the refractometer.

Example 1

In this example, NaOH was used to adjust the initial pH of the starch slurry and the resulting effects on the degree of substitution ("D.S.") and reaction efficiency ("R.E.") of the starch were measured.

Waxy maize starch (100 g) was suspended in distilled water (150 mL) with agitation. The pH of the starch slurry was adjusted to 7.5 and 9.5 with 3% (w/w) NaOH. The suspension was filtered and the starch cake was mixed with 3% OSA (based on the dry weight of starch) using a mixer (Model K45SSWH, KitchenAid, St. Joseph, Mich.) at 2nd speed for 15 minutes. The mixture was dried in a forced-air oven at 35° C. overnight until the moisture content was below 12%. The starch mixture was spread over an oven pan (38 cm×26 cm) and heated at 160° C. for 1 hour, 2 hours, or 4 hours. Native waxy maize starch was used as a control. Degree of substitution and reaction efficiency were measured by titration method 1. pH after treatment was measured by suspending a portion of the treated starch in water (10% solids by weight).

As shown in Table 1, D.S. and R.E. were greater at a the higher pH and longer heat treatment times.

TABLE 1

Sample adjusted to pH 7.5 and 9.5 by NaOH and heat treated at 160° C.

| No. | Adjusted pH | Temperature (° C.) | Reaction time | % OSA | D.S. | R.E. % | pH after treatment |
|---|---|---|---|---|---|---|---|
| 1-A | 7.5 | 160 | 0 h | N/A | N/A | N/A | 2.68 |
| | | | 1 h | 0.91 | 0.0070 | 30.17 | 2.92 |
| | | | 2 h | 1.09 | 0.0085 | 36.17 | 2.74 |
| | | | 4 h | 1.22 | 0.0096 | 40.82 | 2.98 |
| 1-B | 9.5 | 160 | 0 h | N/A | N/A | N/A | 3.45 |
| | | | 1 h | 1.4481 | 0.0113 | 48.27 | 3.56 |
| | | | 2 h | 1.7160 | 0.0135 | 57.20 | 3.91 |
| | | | 4 h | 1.9624 | 0.0154 | 65.41 | 4.07 |

Example 2

In this example, $Na_2CO_3$ was used to adjust the initial pH of the starch slurry and the resulting effects on Degree of Substitution ("D.S."), reaction efficiency ("R.E."), and starch solubility were measured.

Waxy maize starch (100 g) was suspended in distilled water (150 mL) with agitation. A weighed amount of $Na_2CO_3$ was added to the starch slurry. The experiments were carried out as described in Example 1, except that sample 2-A was heated at 160° C. for 4 hours, then was reheated at 190° C. for 2 hours. In contrast, sample 2-B was heated at 190° C. for 2 hours. D.S. and R.E. of the samples heat treated at 190° C. were calculated using titration method 2. D.S. and R.E. of other samples were determined by titration method 1.

As shown in Table 2, the more basic $Na_2CO_3$-treated starch slurries generally produced higher D.S. and R.E.

values. The highest D.S. was achieved at pH 10.3. In addition, solubility of the starch was found to be higher when the starch slurry combined with $Na_2CO_3$ was exposed to higher temperatures, such as in Samples 2-A and 2-B.

TABLE 2

Samples adjusted to different pH values by $Na_2CO_3$ and heat treated at 160° C.

| No. | Adjusted | % $Na_2CO_3$ | Reaction time | % OSA | D.S. | R.E. % | pH | % Solubility |
|---|---|---|---|---|---|---|---|---|
| 2-A | 4.71 | 0 | 0 h | N/A | N/A | N/A | 3.89 | N/A |
|  |  |  | 1 h | 0.4904 | 0.0038 | 16.35 | 2.73 | N/A |
|  |  |  | 2 h | 0.6447 | 0.0050 | 21.49 | 2.84 | 7.5 |
|  |  |  | 4 h | 0.6070 | 0.0047 | 20.23 | 2.47 | 22.0 |
|  |  |  | 160° C. 4 h+ | 1.5570 | 0.0122 | 51.90 | 2.85 | 95.0 |
| 2-B | 9.63 | 0.56 | Before air dry | N/A | N/A | N/A | 4.14 | N/A |
|  |  |  | 0 h | N/A | N/A | N/A | 3.17 | N/A |
|  |  |  | 190° C. 2 h* | 1.86 | 0.0146 | 62.10 | 3.80 | 100.0 |
| 2-C | 9.72 | 1 | Before air dry | N/A | N/A | N/A | 5.20 | N/A |
|  |  |  | 1 h | 1.68 | 0.0132 | 56.12 | 5.12 | N/A |
|  |  |  | 2 h | 1.87 | 0.0147 | 62.36 | 5.39 | N/A |
|  |  |  | 4 h | 1.92 | 0.0151 | 63.85 | 5.64 | 0.0 |
| 2-D | 10.3 | 1.5 | 0 h | N/A | N/A | N/A | 4.99 | N/A |
|  |  |  | 1 h | 2.06 | 0.0162 | 68.73 | 5.27 | N/A |
|  |  |  | 2 h | 1.99 | 0.0156 | 66.26 | 3.10 | 1.0 |
|  |  |  | 4 h | 2.18 | 0.0172 | 72.68 | 3.03 | 1.0 |
| 2-E | 10.32 | 2.58 | 0 h | N/A | N/A | N/A | N/A | N/A |
|  |  |  | 1 h | 1.69 | 0.0133 | 56.29 | 9.34 | N/A |
|  |  |  | 2 h | 2.11 | 0.0166 | 70.30 | 8.09 | 5.0 |
|  |  |  | 4 h | 1.83 | 0.0143 | 60.87 | 6.67 | 5.0 |
| 2-F | 10.51 | 4.57 | Before air dry | N/A | N/A | N/A | 9.52 | N/A |
|  |  |  | 0 h | N/A | N/A | N/A | 9.97 | N/A |
|  |  |  | 1 h | 1.53 | 0.0120 | 51.06 | 10.73 | N/A |
|  |  |  | 4 h | 2.04 | 0.0161 | 68.06 | 8.84 | 10.0 |

Example 3

In this example, $NH_4HCO_3$ was used to adjust the initial pH and the resulting effects on Degree of Substitution ("D.S."), reaction efficiency ("R.E."), and starch solubility were measured.

Waxy maize starch (100 g) was suspended in distilled water (150 mL) with agitation. A weighed amount of $NH_4HCO_3$ was added to the suspension. The experiment was carried out as described in Example 1. Sample 3-A was heated at 160° C. for 4 hours was reheated at 190° C. for 2 hours. D.S. and R.E. were measured by titration method 2.

As shown in Table 3, the use of $NH_4HCO_3$ was effective in achieving relatively high D.S. and R.E. values especially when the starch was heated for longer periods of time and/or at higher temperatures. In addition, it was shown that use of $NH_4HCO_3$ in conjunction with a higher heat treatment temperature (190° C.) greatly increased the solubility of the sample.

TABLE 3

Samples adjusted to pH 8.57 by $NH_4HCO_3$, and heat treated at 160° C.

| No. | Adjusted pH | % $NH_4HCO_3$ (w/w) | Reaction time | % OSA | D.S. | R.E. % | pH | % Solubility |
|---|---|---|---|---|---|---|---|---|
| 3-A | 8.57 | 3.02 | 0 h | N/A | N/A | N/A | 2.60 | N/A |
|  |  |  | 1 h | 1.69 | 0.0132 | 56.26 | 2.34 | N/A |
|  |  |  | 2 h | 1.86 | 0.0146 | 61.95 | 2.34 | 5.0 |
|  |  |  | 4 h | 1.59 | 0.0125 | 53.09 | 2.83 | 25.0 |
|  |  |  | +190° C. 2 h | 2.32 | 0.0183 | 77.37 | 2.57 | 92.0 |

Examples 4-6

In these examples the weight of $NH_4HCO_3$ added to the starch slurry was varied and the effects on degree of substitution ("D.S."), reaction efficiency ("R.E."), and starch solubility were measured.

Waxy maize starch (100 g) was suspended in distilled water (150 mL) with agitation. The pH of the starch slurry was adjusted to between 8.0-8.8 by the addition of varying amounts of $NH_4HCO_3$. The experiments were carried out as described in Example 1; however, the heating temperature was adjusted to 170° C., 180° C., or 190° C., and heating time was adjusted to ½ hour, 1 hour, 2 hours, or 4 hours. A starch sample without adding OSA was prepared as a control. D.S. and R.E. were measured by titration method 2.

As shown in Tables 4-6, increased amounts of $NH_4HCO_3$ and longer exposure to higher temperatures led to an increase in D.S., R.E., and solubility of the starch.

TABLE 4

Samples adjusted to pH 8.0 by $NH_4HCO_3$ (0.27% by starch dry weight) and heat treated at different temperatures.

| No. | Temp | Time | % OSA | D.S. | R.E. % | pH | Solubility |
|---|---|---|---|---|---|---|---|
| 4-A | 170° C. | cake | N/A | N/A | N/A | 4.15 | N/A |
| | | 0 h | 0.71 | 0.0055 | 23.71 | 2.81 | 0.0 |
| | | ½ h | 1.18 | 0.0092 | 39.48 | 2.58 | 0.0 |
| | | 1 h | 1.50 | 0.0117 | 49.91 | 2.49 | 6.0 |
| | | 2 h | 2.22 | 0.0175 | 73.90 | 2.72 | 72.0 |
| | | 4 h | 2.20 | 0.0174 | 73.36 | 2.97 | 95.0 |
| 4-B | 180° C. | cake | N/A | N/A | N/A | 5.54 | N/A |
| | | 0 h | N/A | N/A | N/A | 3.42 | N/A |
| | | ½ h | 0.66 | 0.0051 | 21.99 | 3.40 | 0.0 |
| | | 1 h | 1.61 | 0.0126 | 53.60 | 3.09 | 2.0 |
| | | 2 h | 2.50 | 0.0198 | 83.22 | 2.89 | 20.0 |
| | | 4 h | 2.80 | 0.0222 | 93.45 | 2.94 | 92.5 |
| 4-C | 190° C. | ½ h | 1.73 | 0.0136 | 57.70 | 2.77 | 5.0 |
| | | 1 h | 2.59 | 0.0205 | 86.26 | 2.77 | 30.0 |
| | | 2 h | 2.68 | 0.0212 | 89.36 | 2.82 | 100.0 |
| | | 4 h | 2.70 | 0.0214 | 89.98 | 2.93 | 98.0 |

TABLE 5

Samples adjusted to pH 8.5 by $NH_4HCO_3$ (3.85% by starch dry weight) and heat treated at different temperatures.

| No. | Temp | Time | % OSA | D.S. | R.E. % | pH | Solubility |
|---|---|---|---|---|---|---|---|
| 5-A | 170° C. | cake | N/A | N/A | N/A | 6.48 | N/A |
| | | 0 h | N/A | N/A | N/A | 5.19 | 5.0 |
| | | ½ h | 2.36 | 0.0186 | 78.56 | 2.82 | 5.0 |
| | | 1 h | 2.29 | 0.0181 | 76.30 | 2.79 | 5.0 |
| | | 2 h | 2.72 | 0.0216 | 90.61 | 2.81 | 85.0 |
| | | 4 h | 2.61 | 0.0207 | 87.14 | 2.83 | 100.0 |
| 5-B | 180° C. | ½ h | 2.33 | 0.0184 | 77.82 | 2.80 | 5.0 |
| | | 1 h | 2.68 | 0.0212 | 89.36 | 2.76 | 80.0 |
| | | 2 h | 2.57 | 0.0204 | 85.71 | 2.81 | 102.5 |
| | | 4 h | 2.58 | 0.0204 | 86.04 | 2.85 | 85.0 |
| 5-C | 190° C. | ½ h | 2.10 | 0.0165 | 69.96 | 3.24 | 6.0 |
| | | 1 h | 2.72 | 0.0216 | 90.82 | 2.87 | 86.0 |
| | | 2 h | 2.61 | 0.0206 | 86.90 | 2.91 | 100.0 |
| | | 4 h | 2.38 | 0.0188 | 79.41 | 2.91 | 96.0 |

TABLE 6

Samples adjusted to pH 8.75 by $NH_4HCO_3$ (6.29% by starch dry weight) and heat treated at different temperatures.

| No. | Temp | Time | % OSA | D.S. | R.E. % | pH | Solubility |
|---|---|---|---|---|---|---|---|
| 6-A | 170° C. | cake | N/A | N/A | N/A | N/A | N/A |
| | | 0 h | 0.61 | 0.0047 | 20.18 | 4.30 | N/A |
| | | ½ h | 1.74 | 0.0137 | 57.99 | 3.61 | 2.5 |
| | | 1 h | 2.10 | 0.0165 | 69.94 | 3.09 | 5.0 |
| | | 2 h | 2.12 | 0.0167 | 70.70 | 3.00 | 7.5 |
| | | 4 h | 2.79 | 0.0221 | 92.87 | 3.02 | 81.0 |
| 6-B | 180° C. | ½ h | 2.22 | 0.0176 | 74.18 | 2.86 | 5.0 |
| | | 1 h | N/A | N/A | N/A | 2.98 | 90.0 |
| | | 2 h | N/A | N/A | N/A | 3.02 | 95.0 |
| | | 4 h | N/A | N/A | N/A | 3.03 | 97.5 |
| 6-C | 190° C. | ½ h | N/A | N/A | N/A | 2.92 | 0.00 |
| | | 1 h | N/A | N/A | N/A | 2.80 | 95.0 |
| | | 2 h | N/A | N/A | N/A | 2.81 | 101.0 |
| | | 4 h | N/A | N/A | N/A | 2.78 | 100.0 |

Example 7

In this example, the viscosities exhibited by different starch samples from Examples 4, 5, and 6 were measured.

Viscosity of the starch samples was determined by a Brookfield viscometer (RVDVII+ Pro, Brookfield Engineering Laboratories, Inc., Middleboro, Mass.) with a CS4-18 spindle and a SC4-13 RPY chamber at 25° C. Starch solutions of 30% and 50% solids of lab made starches and a commercial starch were prepared and added to the chamber. The commercial starch is a converted (degraded), OSA-modified starch obtained from National Starch LLC, Bridgewater, N.J. The spindle speed (RPM) was selected. The reading of shear stress (SS), shear rate (SR), viscosity (cP) and % (torque) are shown in Table 7.

Viscosity of a starch solution reflects the molecular weight of starch sample. Compared with a commercial sample, the lab made starch sample showed higher viscosity indicating that the molecular size of the lab made sample was higher than that of the commercial sample.

TABLE 7

Viscosity of OS starch and a commercial starch solution

| Sample | Starch Concentration (%) | SS | SR | CP | % | RPM |
|---|---|---|---|---|---|---|
| 4-A, 4 h | 50 | 262.3 | 9.30 | 2825 | 56.5 | 10 |
| 5-A, 2 h | 50 | 146.9 | 2.33 | 6340 | 31.8 | 5 |
| 6-A, 4 h | 50 | 124.2 | 9.30 | 1340 | 26.7 | 10 |
| Commercial | 50 | 135.3 | 18.60 | 727.5 | 29.1 | 20 |
| Commercial | 30 | 43.2 | 93.0 | 46.5 | 9.3 | 100 |
| 5-B, 2 h | 30 | 96.7 | 93.0 | 104.0 | 20.8 | 100 |

Example 8

In this example, the effect of grinding the starch prior to heat treatment on solubility was measured.

Waxy maize starch (100 g) was suspended in distilled water (150 mL) with agitation. The pH of the starch slurry was adjusted to 8.45 by different weights of $NH_4HCO_3$ (Table 8). The experiment was carried out as in Example 1. However, the heating temperature was adjusted to 170° C. or 180° C., and heating time was 2 hours. For sample 7-D, the OSA-modified starch was sieved by a 200-mesh sifter after heating. For sample 7-E, the starch mixture before heating was ground by an analytical mill (A-10, Tekmar) and sieved through a 200-mesh sifter. The starch was thinly spread over an oven pan (38 cm×26 cm) and heated at 180° C. for 2 hours. A starch sample without adding OSA was prepared as a control. D.S. and R.E. were measured by titration method 2.

Solubility of the OS starch dispersed in an aqueous medium (10%, w/w) was analyzed by a potable refractometer before centrifugation ("SBC"). The starch solution was centrifuged at 3500 rpm for 5 minutes and the supernatant was analyzed by the refractometer as well ("SAC").

As shown in Table 8, grinding of the starch prior to heal treatment appeared to have a slight positive effect on the solubility of the starch product when compared to samples that had not undergone grinding.

TABLE 8

Samples adjusted to pH 8.45 by $NH_4HCO_3$ (6.29% by starch dry weight) and heat-treated at different temperatures.

| No. | Wt of $NH_4HCO_3$ (g) | #200 mesh sieve | Temp (° C.) | pH after heating | SBC (%) | SAC (%) | % OSA | D.S. | R.E. (%) |
|---|---|---|---|---|---|---|---|---|---|
| 7-A | 3.02 | No | 170 | 3.23 | 100 | 84.2 + 3.8 | 2.80 | 0.0222 | 93.19 |
| 7-B | 4.00 | No | 170 | 3.19 | 90 | N/A | N/A | N/A | N/A |
| 7-C | 3.85 | No | 170 | 3.25 | 72 | N/A | N/A | N/A | N/A |
| 7-D | 3.85 | Yes | 180 | 2.81 | 102.5 | 94 | 2.57 | 0.0204 | 85.71 |
| 7-E | 3.02* | Yes | 180 | 3.01 | N/A | 99 | 2.68 | 0.0213 | 89.47 |

*Cake moisture: 50.20%

Example 9

This Example describes an embodiment of the present application directed to a non-food application using a 5% OSA treatment.

Waxy maize starch (100 g) was suspended in distilled water (150 mL) with agitation. The pH of the starch slurry was adjusted to 8.30 with 3.02 g $NH_4HCO_3$. The suspension was filtered and the starch cake was mixed with 5% OSA (based on the weight of starch) by a mixer (Model K45SSWH, KitchenAid, St. Joseph, Mich.) at $2^{nd}$ speed for 15 minutes. The mixture was dried in an air oven at 35° C. overnight until the moisture content was below 12%. The mixture was then spread over an oven pan (38 cm×26 cm) and heated at 180° C. for 2 hours. Afterwards, the starch mixture was ground by an analytical mill (A-10, Tekmar) and sieved through a 200-mesh sifter. A starch sample without adding OSA was prepared as a control. D.S. and R.E. were measured by titration method 2.

The bound OS content was 4.77%. The D.S. and R.E. of the OS starch were 0.0386 and 93.43%, respectively. Solubility of the OS starch was analyzed by a potable refractometer. The starch solution (10%, w/w) was centrifuged at 3500 rpm for 5 minutes. The solubility of the material was found to be 86%.

Example 10

In this example, wheat starch (100 g) was suspended in distilled water (150 mL) with agitation. The pH of the starch slurry was adjusted to 8.45 by adding 3.02 g $NH_4HCO_3$. The experiment was carried out as described in Example 9 except that 3% OSA was added. The bound OS content was 2.59%. The D.S. of the OS starch was 0.0205, and the R.E. was 94.33%. The solubility of the OS starch was 75%.

Example 11

Figure 1B:
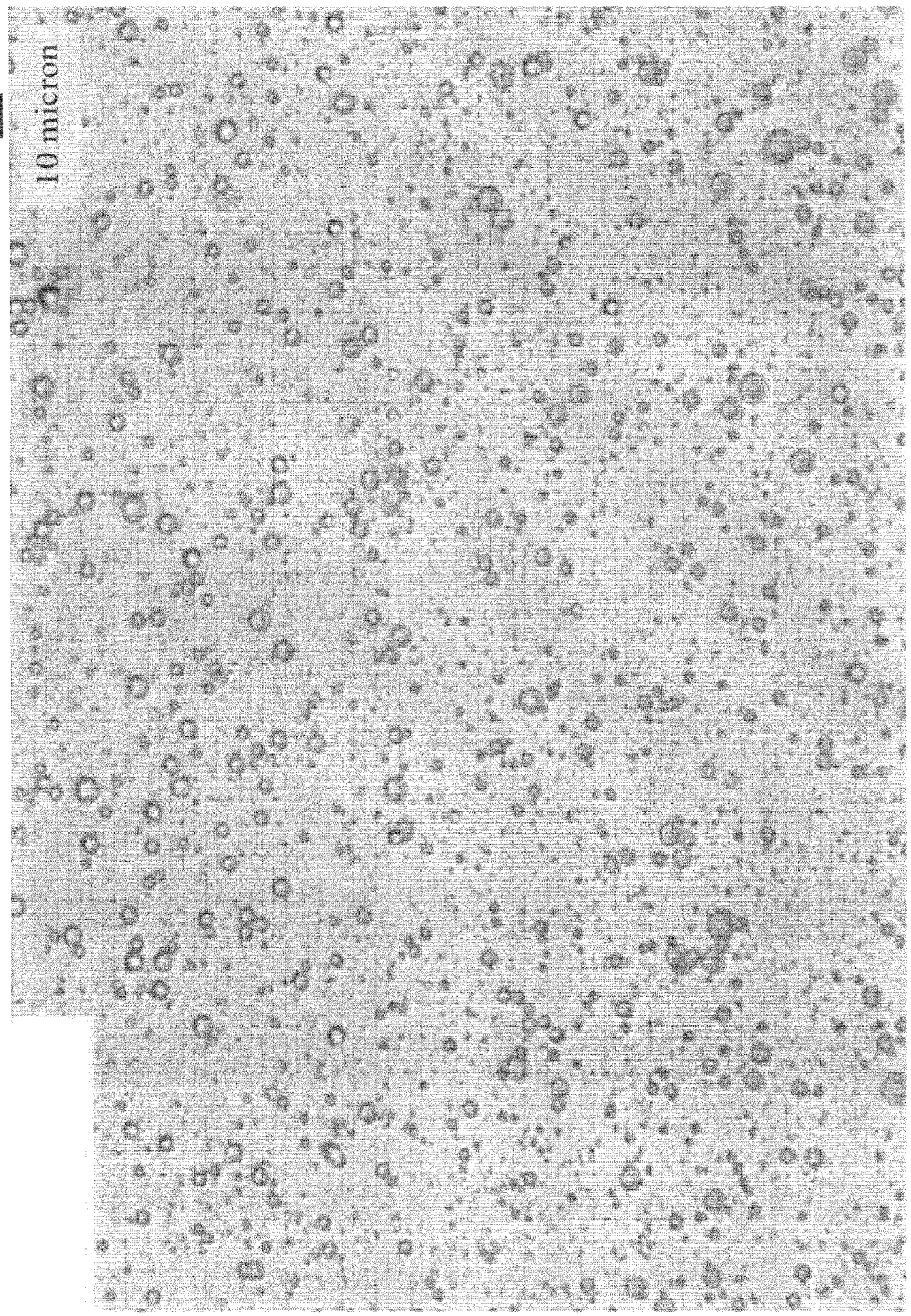
FIG. 1b is a microscope photograph of a second emulsion sample prepared from sample 7-E after heating at 45° C. for 24 hours.

In this example an emulsion of sample 7-E was prepared. OS starch (8.0 g, dry basis) was mixed with sodium benzoate (0.1 g), citric acid (0.2 g) and water (50.40 mL) in a Waring blender (Model 31BL92, Dynamics Corporation of America). The mixture was blended at low speed (powerstat at 25-30) for 2 minutes. Orange oil (8 g) was slowly added to the mixture over 30 seconds and the mixture was blended for an additional 30 seconds. The jar was then covered and blended at a high speed (powerstat at 100) for 2 minutes. The emulsion solution was permitted to rest in the blender for 30 minutes and transferred to a tall glass jar (10 oz.). The jar was capped and heated at 45° C. in an air oven for 24 hours. The emulsion was very stable after heating at 45° C. for 24 hours. Microscope photographs of the emulsion were taken and are shown in FIGS. 1a and 1b and depict a small oil droplet size.

Example 12

Figure 2A:
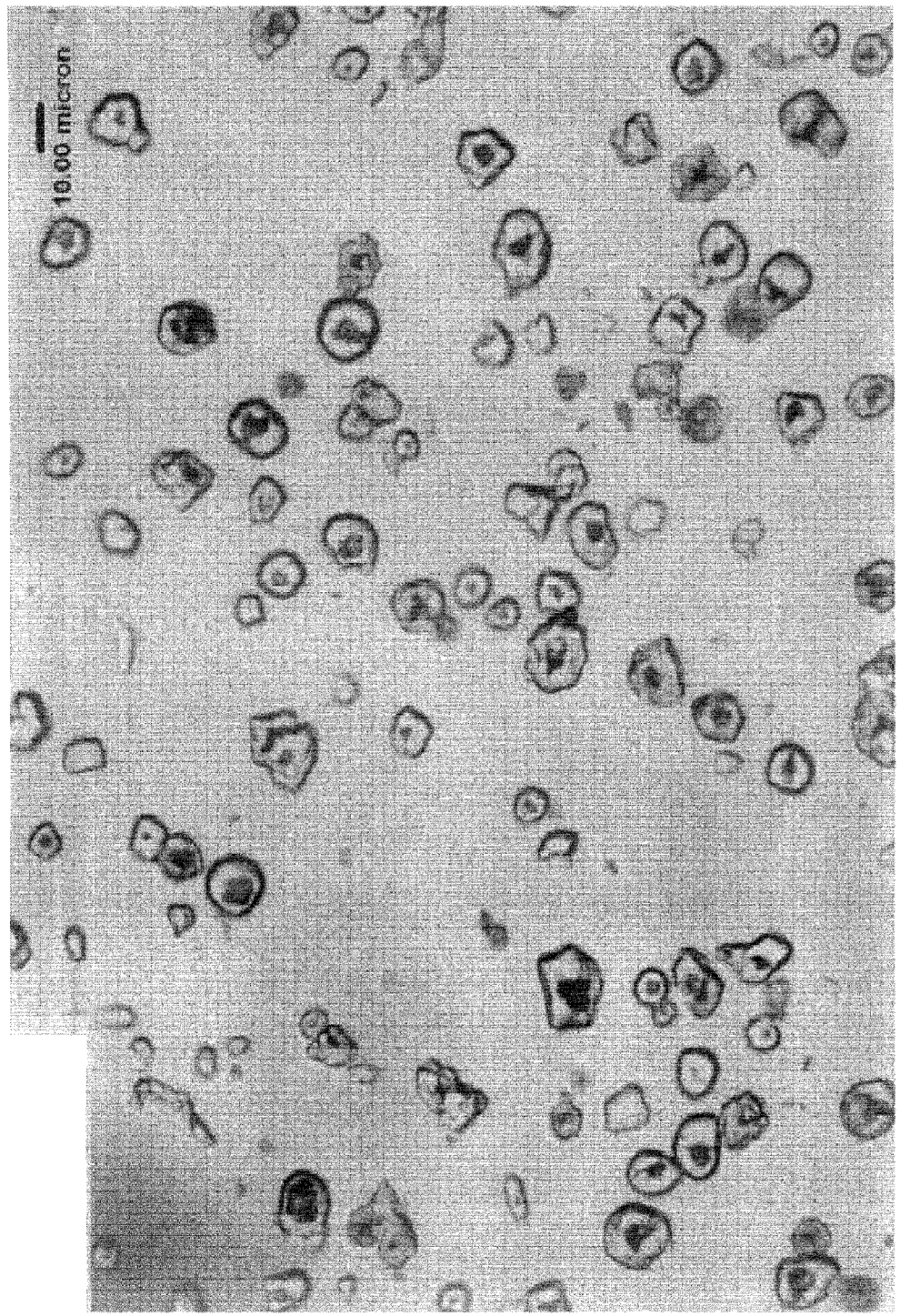
FIG. 2a is a microscope photograph of sample 7-E suspended in glycerol.
Figure 2B:
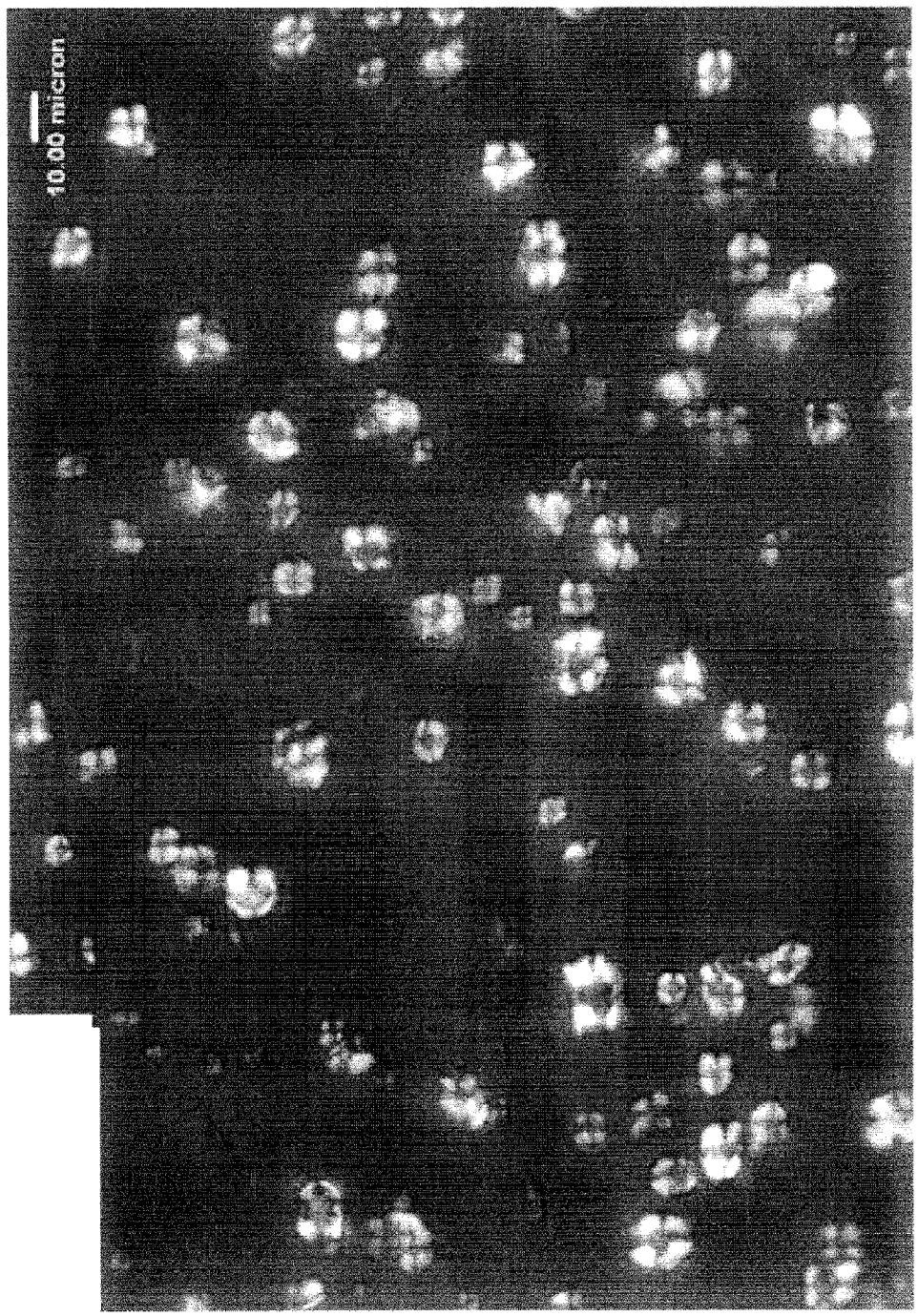
FIG. 2b is a microscope photograph of sample 7-E suspended in glycerol taken under polarized light.
Figure 3A:
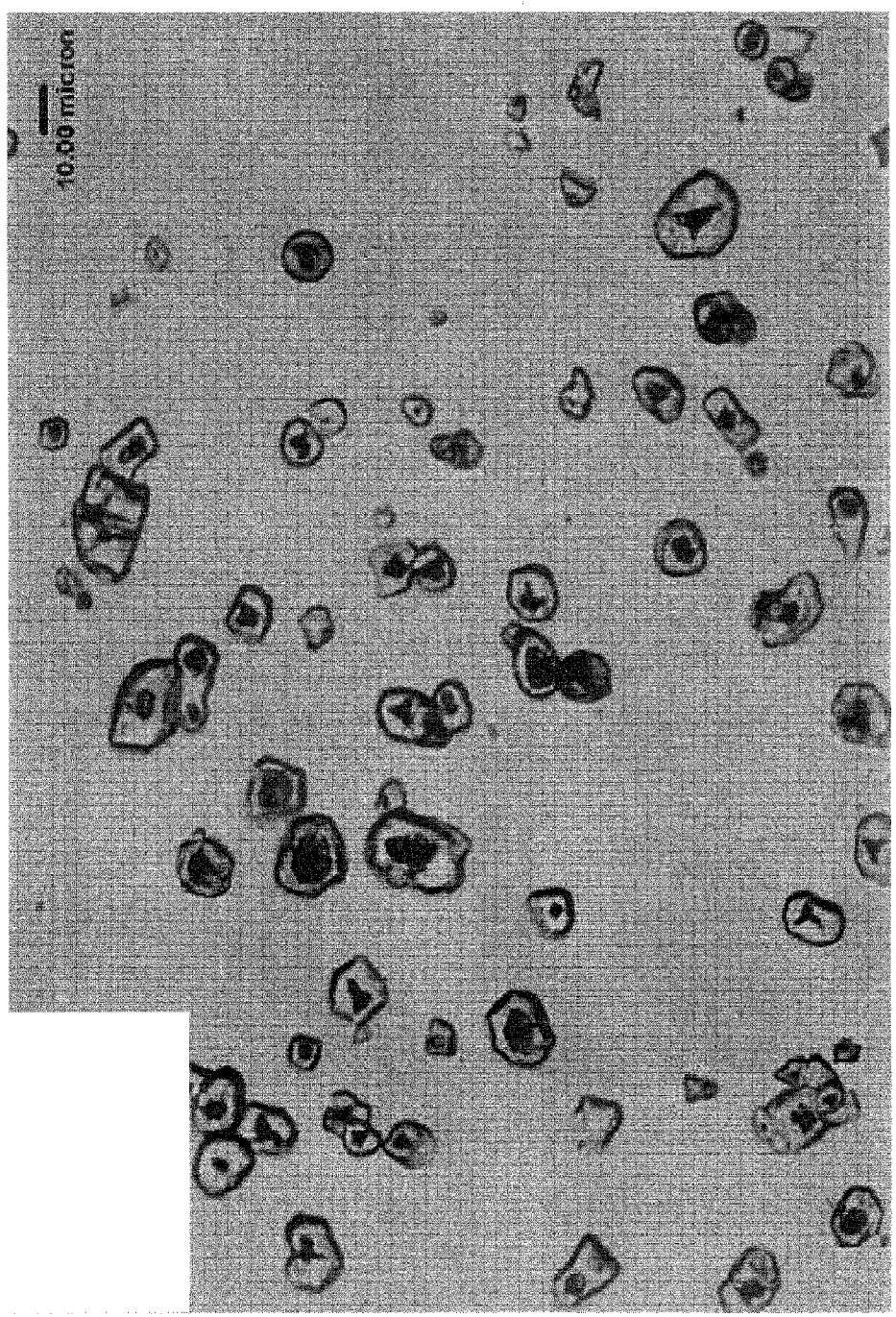
FIG. 3a is a microscope photograph of sample 5-B suspended in glycerol.
Figure 3B:
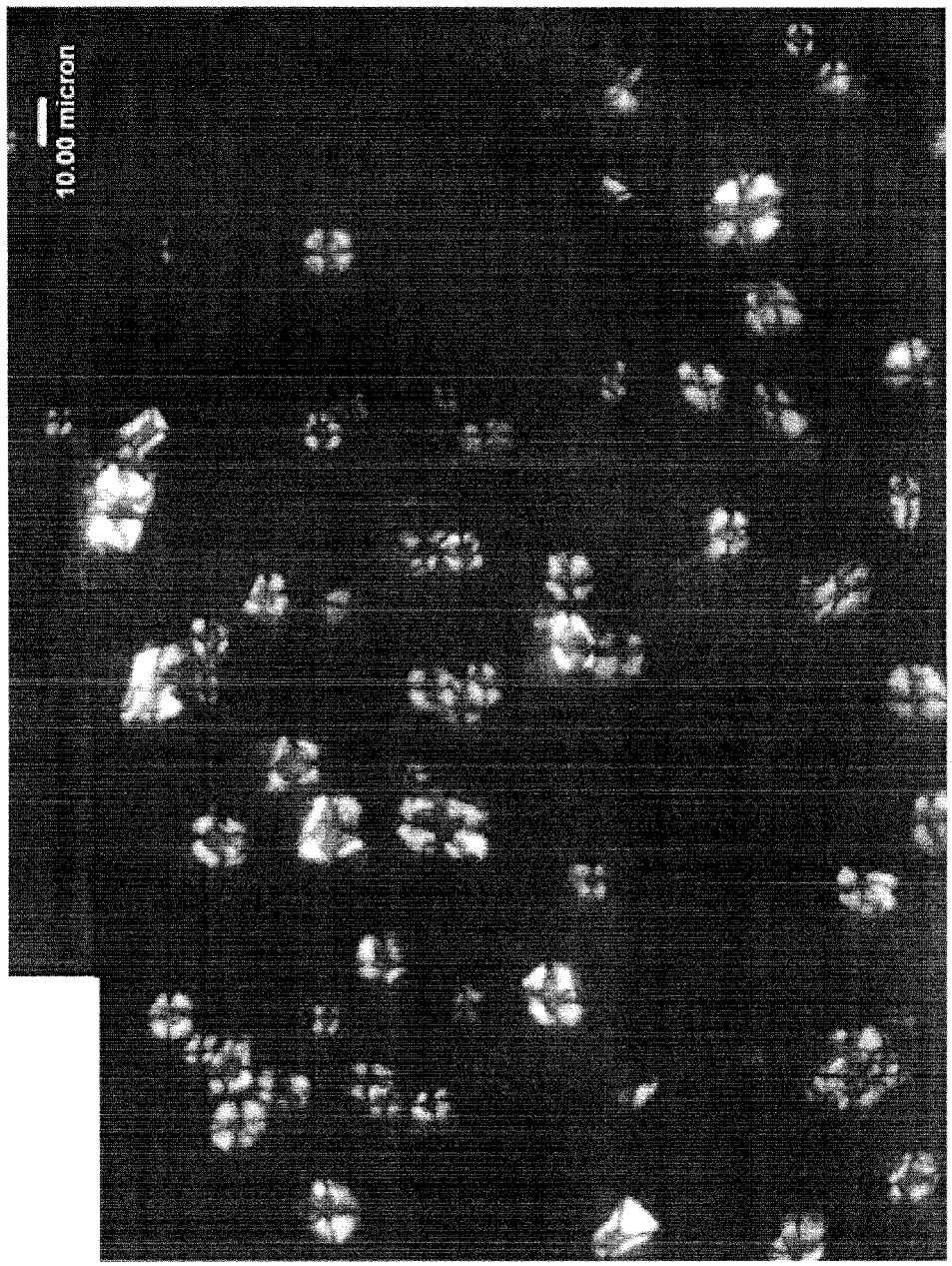
FIG. 3b is a microscope photograph of sample 5-B suspended in glycerol taken under polarized light.

In this example, Samples 7-E and 5-B (both heat treated for 4 hours) were suspended in glycerol and viewed with a microscope under normal and polarized light. FIGS. 2a and 2b depict Sample 7-E under normal and polarized light, respectively. FIGS. 3a and 3b depict Sample 5-B under normal and polarized light, respectively. FIGS. 2b and 3b show that starch granules of both samples had maltese crosses and were birefringent when viewed under polarized light. The results suggest that certain molecular order of starch granules remained after OSA modification.

Example 13

Figure 4:
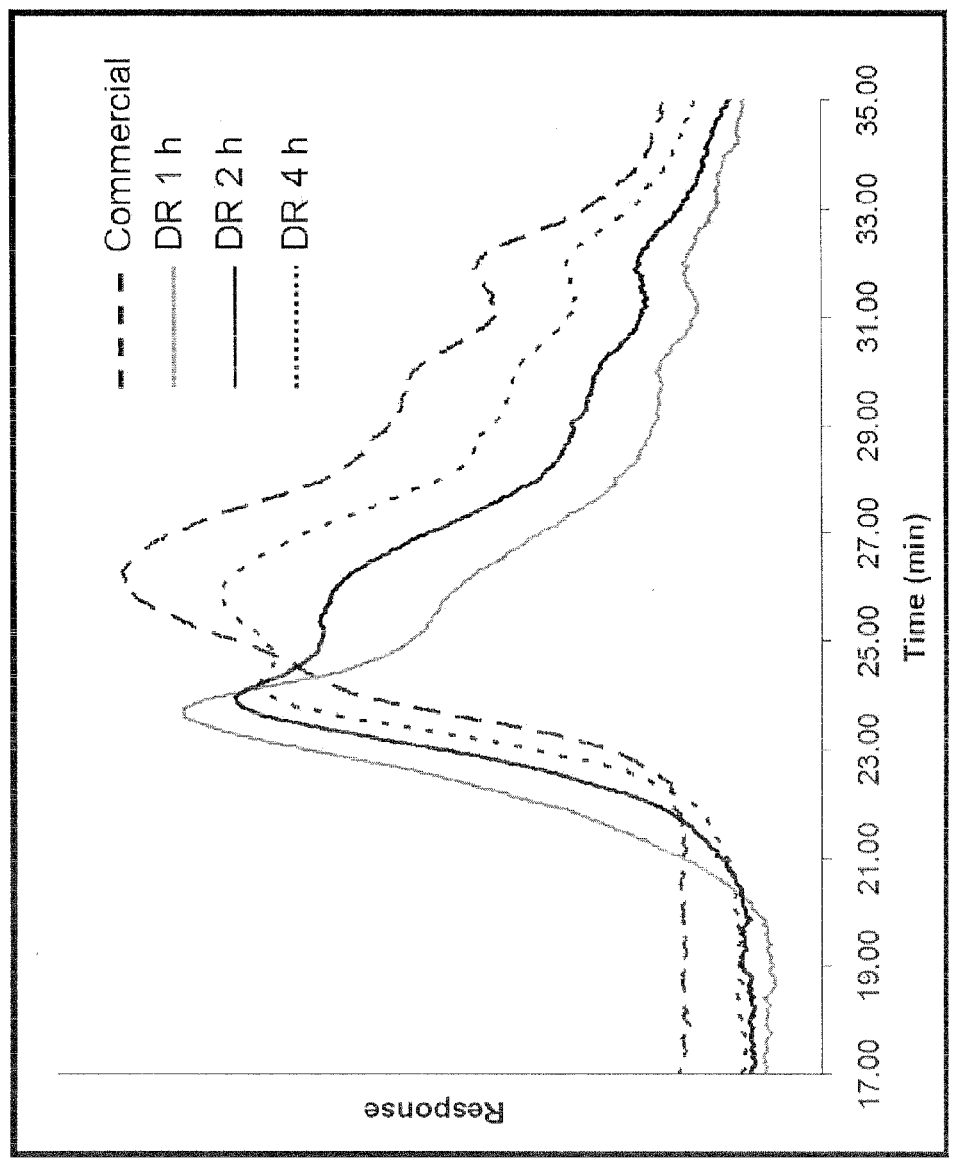
FIG. 4 is a graph of gel permission chromatography (GPC) results for samples 5-B and a commercial sample.

In this example, Sample 5-B (heat treated for 1 hour, 2 hours, and 4 hours) and a commercial sample (same as used in Example 7 above) were analyzed by gel permission chromatography (GPC). The starch (0.1% by weight) was dispersed in DMSO and heated in a boiling water bath for 1 hour. Then the solution was analyzed by the GPC. The results are shown in FIG. 4. The lab made OS samples exhibited larger molecular weights than the commercial sample.

Example 14

In this example, waxy maize starch (100 g) was suspended in distilled water (150 mL) with agitation. The pH of the starch slurry was adjusted to 8.46 by the addition of 3.02 g $NH_4HCO_3$. The suspension was filtered and the starch cake was mixed with 50% OSA (by the weight of starch). The mixture was dried in an air oven at 35° C. overnight until the moisture content was below 12%. The starch mixture was heated in the air-forced oven at 130° C. for 1 h and then 105° C. for 6 h. After the product was cooled to 25° C., a sample (5 g) was washed twice with methanol (50 ml). The D.S. of the methanol-washed product was then measured by titration method 1 and the value was determined to be 0.0138.

Example 15

In this example, an OS starch was prepared and the D.S. measured by an NMR method described as follows. The starch sample (0.1 g) was dissolved in 0.5 mL of $D_2O$ and freeze-dried. The $D_2O$-exchanged starch (0.07 g) was dissolved in $D_2O$ (0.60 mL) for NMR analysis. $^1H$ NMR 1D spectra were recorded on a 400 MHz Varian NMR spectrometer at 25° C. The NMR spectrometer was equipped with a 5-mm diameter, triple-resonance, inverse-detection, pulse-field-gradient probe operating at 399.74 MHz. The $^1H$ spectra were collected in 64 individual scans with a sweep width of 16 ppm and a delay time of 1 s. Sodium 3-(trimethylsilyl) propionate-2,2,3,3-$d_4$(TSP) was used as a reference (0 ppm). Chemical shifts are reported in parts per million (ppm). DS was calculated from the NMR spectra by using the following equation:

$$DS = \frac{I_{0.94}/3}{I_{5.39} + I_{5.12} + I_{4.96} + I_{4.61} + I_{4.51}}$$

where $I_{0.94}$ is the integrals of methyl protons, $I_{5.39}$, $I_{5.12}$, $I_{4.96}$, $I_{4.61}$ and $I_{4.51}$ are the integrals of the anomeric proton.

Waxy maize starch (100 g) was suspended in distilled water (150 mL) with agitation. The pH of the starch slurry was adjusted to 8.45 by 3.02 g $NH_4HCO_3$. The suspension was filtered and the starch cake was mixed with 3% OSA (by the weight of starch) by a mixer (Model K45SSWH, KitchenAid, St. Joseph, Mich.) at 2nd speed for 15 min. The mixture was dried in an air oven at 35° C. overnight until the moisture content was below 12%. The starch mixture (31.12 g) was mixed with sodium aluminum phosphate (SAP) (3.09 g). The pH of the starch sample was 4.90 with SAP. The starch was heated in the air-forced oven at 180° C. for 2 h. Alter the product was cooled to room temperature, a sample (0.15 g) was extracted by methanol (2 ml), and the extraction was repeated. The sample (0.07 g) was dissolved in $D_2O$ (0.6 mL) and the D.S. of the product was measured by the NMR method to be 0.01989.

We claim:

1. A method of preparing a water soluble lipophilic starch comprising:
   (a) forming a starch slurry by dispersing a quantity of starch in a liquid medium;
   (b) adjusting the pH of said starch slurry to between about 7 to about 11 by adding a base thereto, wherein said base is selected from the group consisting of ammonium carbonate, ammonium bicarbonate, and mixtures thereof;
   (c) removing at least a portion of said liquid medium from said starch slurry to form dehydrated starch solids;
   (d) adding an organic acid anhydride reagent to said dehydrated starch solids thereby forming a reaction mixture, said organic acid anhydride reagent having the formula

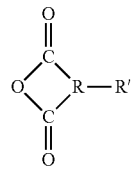

wherein R is a dimethylene or trimethylene group and R' is a linear, branched or cyclic alkyl, alkenyl, aralkyl or aralkenyl group having 2 to 20 carbon atoms;
   (e) drying said reaction mixture to a moisture content of between about 0 to about 15% by weight; and
   (f) heating said dried reaction mixture at a temperature of at least about 100° C. for between about 1 minute to about 6 hours to thereby produce said water soluble lipophilic starch, wherein said water soluble lipophilic starch has an acidic pH.

2. The method according to claim 1, wherein said liquid medium is selected from the group consisting of water, alcohol, or combinations thereof.

3. The method according to claim 1, wherein said step of removing at least a portion of said liquid medium from said starch slurry to form said dehydrated starch solids comprises filtering said starch slurry.

4. The method according to claim 1, wherein said organic acid anhydride reagent comprises octenyl succinic anhydride.

5. The method according to claim 1, wherein said organic acid anhydride reagent is added to said reaction mixture at a level of between about 0.5% to 100% by weight, based on the dry weight of the starch.

6. The method according to claim 1, wherein said step of drying said reaction mixture comprises heating said reaction mixture to a temperature of less than 120° C. until said moisture content of between about 0% to about 15% by weight is achieved.

7. The method according to claim 1, wherein said step of heating said dried reaction mixture comprises heating said dried reaction mixture at a temperature of between about 100° C. to about 200° C.

8. The method according to claim 7, wherein said step of heating said dried reaction mixture comprises heating said dried reaction mixture at a temperature of between about 140° C. to about 180° C. for between about 30 minutes to about 3.5 hours.

9. The method according to claim 1, wherein said water soluble lipophilic starch contains less than about 0.5% by weight of one or more mineral acids and less than about 0.1% by weight of starch-degrading enzyme residues.

10. The method according to claim 1, wherein said water soluble lipophilic starch has a solubility in water at 25° C. of greater than about 90%.

11. The method according to claim 1, wherein no base is added during said adding of step (d), said drying of step (e), or said heating of step (f).

12. The method according to claim 1, wherein said water soluble lipophilic starch has not been treated with a mineral acid or starch-degrading enzyme.

* * * * *